Oct. 27, 1964  C. J. KOEBEL  3,154,064
MULTIPLE POINT DIAMOND TOOL
Filed April 2, 1962
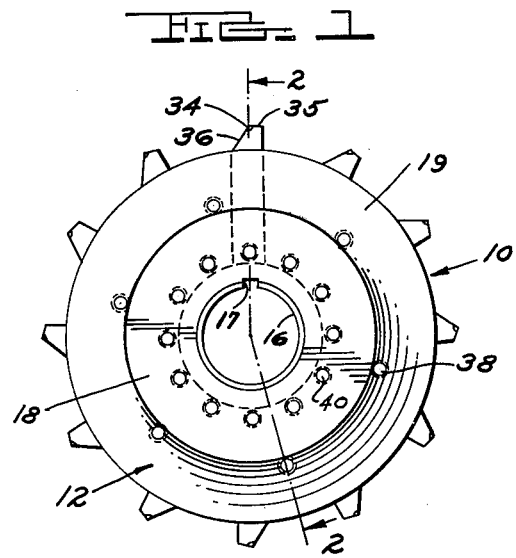
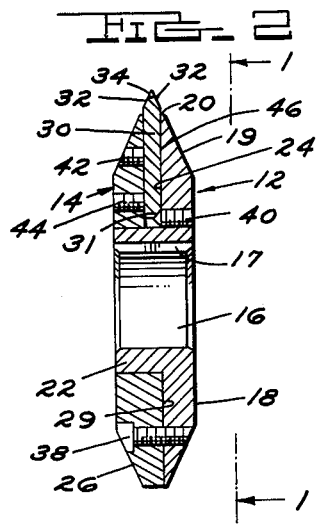
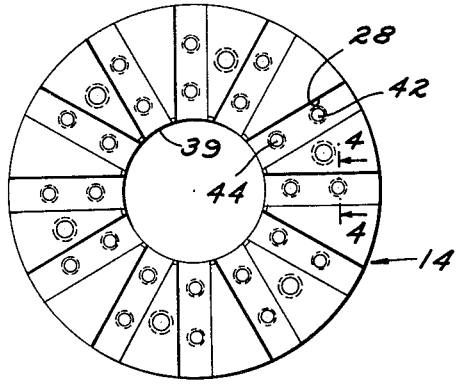
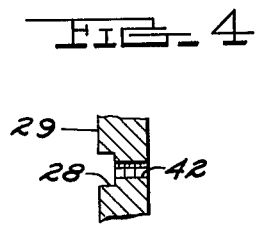
INVENTOR.
CHARLES J. KOEBEL
BY
Farley, Forster & Farley
ATTORNEYS United States Patent Office 3,154,064
Patented Oct. 27, 1964

3,154,064
MULTIPLE POINT DIAMOND TOOL
Charles J. Koebel, Grosse Pointe, Mich., assignor to Koebel Diamond Tool Co., Detroit, Mich., a corporation of Michigan
Filed Apr. 2, 1962, Ser. No. 184,038
4 Claims. (Cl. 125—39)

This invention relates to an improved construction for a cutting tool of the rotary type incorporating a plurality of cutting elements with the cutting tip of each element being formed by a single diamond precisely ground to a cutting shape selected to meet a particular condition. The tool provided can be used for dressing grinding wheels, as is the case with existing tools of the diamond type available for this purpose, but with vastly superior results in the accuracy with which certain dressing operations can be performed and in the life of the dressing tool; also the cutting tool provided can be employed in precision machining operations.

The invention provides a tool construction which includes a tool body adapted to be mounted for rotation on an axis—either on the spindle of a machine or on a tool holder associated therewith. A plurality of cutters, each having a cutting end including a ground diamond tip, are mounted on the tool body by means which insure that the cutting tips track in the same circumferential path about the axis with all cutting tips being radially equidistant therefrom. When this positioning of the cutting elements can be precisely established and maintained, the tool can be rotated at high speeds and if a light cut is taken by each tool element individually in passing over the work, a relatively fast overall cutting action can be obtained with a life of the diamond cutting elements in excess of that realized from presently available tools of the diamond type. In addition, the improved tool can be employed for cutting operations not previously performable with available tools of the diamond type.

In the presently preferred form of mounting for the tool elements to be disclosed in detail herein, a plurality of identical cutters are provided, and the cutting end including the diamond tip of all cutters is ground to a uniform cutting shape. The tool body consists of two separable members, and the means for mounting the cutters so that their cutting tips travel in the same circumferential path about the axis of rotation includes a locating surface formed on one of the tool body members, this locating surface being common for all cutters and extending about the axis of rotation in defined angular relation therewith. Locking means are carried by the second of the tool body members for placing a corresponding portion of each individual cutter in abutting relation with the locating surface. The second member of the tool body, which for convenience will be called a clamping member, also includes means such as a plurality of slots, each slot being adapted to receive one of the cutters, to define the radial position of the cutters with respect to the axis of rotation—or in other words to space the cutting tips about the axis as a center. The tool construction also includes means for adjusting the position of each cutter so that the cutting tip thereof can be precisely positioned at a desired radial distance from the axis of rotation.

Other features and advantages of the invention will be brought out in connection with the following description of the representative, presently preferred embodiment thereof shown in the accompanying drawings consisting of:

FIGURE 1, a plan view of the tool, taken as shown by the arrows 1 on FIG. 2;

FIGURE 2, a sectional elevation taken as indicated by the line 2—2 of FIG. 1;

FIGURE 3, a plan view showing the inner face of the clamping member of the tool body; and FIGURE 4, a sectional detail taken as indicated by the line 4—4 of FIG. 3.

In the construction shown, the tool body 10 is composed of two generally annular members, a locating member 12 and a clamping member 14. Locating member 12 is provided with a central bore 16 and keyway 17 for mounting the tool for rotation on the spindle of a machine or on a tool holder, the axis of the bore 16 corresponding to the axis of such rotation. The outer face 18 of the locating member 12 is formed with a portion 19 which tapers toward the outer edge 20 of the member. The opposite or inner face of the locating member 12 has a collar-like projection 22 through which the bore 16 extends and also has a radially extending locating surface 24 which is precisely formed in a defined angular relation with the axis of the bore 16, this relation being normal in the construction shown.

The clamping member 14 of the tool body is formed with a tapered portion 26 on its outer face corresponding to the tapered portion 19 of the locating member, and has a series of uniform slots 28 (FIGS. 3 and 4) cut in its inner face 29 and extending radially to the axis of the bore 16 in equally spaced relation. Each of these slots 28 receives a cutter 30 which consists of a shank having a chamfered shoulder 31 at its inner end, and a diamond tip 34 mounted on its outer end. This outer end of each cutter including the diamond tip 34 is uniformly ground to a desired shape and cutting angles formed by the tapered side faces 32, the end face 35 and the leading face 36.

The two members 12 and 14 of the tool body are connected together by a series of screws 38, the inner bore 39 of the clamping member 14 being mounted on the collar portion 22 of the locating member 12. When so assembled, a pocket is formed for each one of the cutters 30 by one of the slots 28 of the clamping member 14 and that portion of the locating surface 24 of the member 12 which lies adjacent thereto. Each cutter 30 is mounted in one of these pockets with its inner chamfered end 31 in abutting engagement with the tapered nose of an adjusting screw 40 mounted in the body member 12. This arrangement permits each cutter to be precisely adjusted radially so that the diamond tips 34 of all cutters will be concentric with the axis of the bore 16.

Each cutter is held in adjusted position by locking means consisting of a pair of set screws 42 and 44 carried by the locking member 14. When tightened, these set screws engage the cutter shank so that the action of this locking means is to place a face 46 on the shank of each cutter in abutting relation with the common locating surface 24 on the locating member 12. All of the cutters are thereby held in the tool body in a position such that all diamond cutting tips 34 travel about the axis of the bore 16 in the same circumferential path—in other words without run-out.

This accurate positioning of all the cutting tips is essential for the successful operation of a diamond tipped tool. If any individual cutter were mispositioned either radially or with respect to track, the result would be either destruction or damage to the diamond tip of this cutter from the shock of an excessively large cut each time its turn came to contact the work piece. The present construction enables this accurate tool positioning to be obtained, all component parts of the construction being readily made to the degree of precision required without unduly complicated and expensive machining operations.

While preferred embodiments have been described above in detail, it will be understood that numerous modifications might be resorted to without departing from the scope of the invention as defined in the following claims.

I claim:

1. A multiple point diamond tipped cutting tool comprising a body having means defining an axis of tool rotation, said body including a positioning member and a clamping member, said positioning member being formed with a central collar portion and with a locating surface extending around said axis in defined angular relation therewith outwardly from said central collar portion; said clamping member comprising an annular ring having a central bore slidably engageable with said collar portion and having a surface extending outwardly around said axis adjacent to said locating surface; a plurality of tool element slots formed in the outwardly extending surface of said clamping member, a plurality of similar tool elements each having a cutting tip consisting of a single diamond, each element being slidably mounted in one of said slots, means for securing said clamping member to said positioning member, means carried by said clamping member for locking each of said tool elements in its slot in abutting relation with said locating surface, and means carried by one of said members for forming an individually adjustable radial locating surface for each tool element whereby said tool elements can be precisely positioned with the cutting tips thereof equidistant from said axis of rotation.

2. A rotary type cutting tool comprising a tool body adapted to be mounted for rotation on an axis, the tool body including a pair of members and means for detachably securing said members together, a plurality of cutters each having a cutting end with a diamond mounted at the tip thereof, the cutting end including the diamond tip of all cutters being uniformly ground to a desired cutting shape, means for detachably mounting said cutters on the tool body with the cutting tips thereof spaced circumferentially about said axis and with a corresponding point on each cutting tip located in a common plane perpendicular to said axis, said mounting means comprising a common locating surface formed on one of the body members and extending around said axis in defined angular relation therewith, and a plurality of slots formed in the other of said body members each of said slots being adapted to receive one of said cutters, means for individually adjusting each cutter radially of said axis to position all cutting tips equidistant therefrom, and locking means carried by the slotted body member for locking each of said cutters in adjusted position in abutting relation with the said locating surface of the other body member.

3. A rotary multiple point diamond tipped cutting tool comprising a tool body adapted to be mounted for rotation on an axis, the tool body including a positioning member and a clamping member, a plurality of cutters each having a cutting end with a diamond mounted at the tip thereof, the cutting end including the diamond tip of all cutters being uniformly ground to a desired cutting shape, means for detachably mounting the cutters on the body with the cutting tips thereof spaced circumferentially about said axis, equidistant therefrom and with a corresponding point on each cutting tip located in a common plane perpendicular to said axis, the mounting means including a common locating surface formed on the positioning member and extending around the axis in defined angular relation therewith, means carried by the clamping member for defining the circumferential position of each of said cutters on said locating surface, means for individually adjusting each cutter radially of said axis, locking means carried by a clamping member for forcing each cutter into firm abutting relation with said common locating surface.

4. A diamond cutting tool as claimed in claim 3 wherein the positioning and clamping members are each provided with a tapered portion on the outer face thereof, said tapered portions being located at either side of the cutters and converging on the diamond tips of the cutters.

References Cited in the file of this patent

UNITED STATES PATENTS

| | | |
|---|---|---|
| 58,853 | Maloy | Oct. 16, 1866 |
| 153,568 | Husbands | July 28, 1874 |
| 1,017,880 | Landis | Feb. 20, 1912 |
| 1,646,501 | Slade | Oct. 25, 1927 |
| 2,353,236 | Hammill et al. | July 11, 1944 |
| 2,380,451 | Koebel | July 31, 1945 |
| 2,776,529 | Osplack | Jan. 8, 1957 |
| 3,024,674 | Judd | Mar. 13, 1962 |

FOREIGN PATENTS

| | | |
|---|---|---|
| 21,473 | Sweden | May 22, 1911 |
| 150,493 | Great Britain | Sept. 9, 1920 |
| 673,470 | France | Oct. 8, 1929 |